United States Patent
Horwitz et al.

(10) Patent No.: US 6,552,802 B1
(45) Date of Patent: Apr. 22, 2003

(54) APPARATUS AND METHOD FOR ROLL INVARIANT REFLECTIVE POSITION SENSING

(75) Inventors: Bruce A. Horwitz, Newton Centre, MA (US); Catherine E. DeVoe, Newton, MA (US)

(73) Assignee: Microe Systems, Inc., Natick, MA (US)

( * ) Notice: Subject to any disclaimer, the term of this patent is extended or adjusted under 35 U.S.C. 154(b) by 0 days.

(21) Appl. No.: 09/564,077

(22) Filed: May 3, 2000

Related U.S. Application Data

(60) Provisional application No. 60/132,347, filed on May 4, 1999.

(51) Int. Cl.[7] .................................................. G01B 9/02
(52) U.S. Cl. ....................................................... 356/499
(58) Field of Search ................................ 356/488, 494, 356/499; 250/237 G, 231.14, 231.16

(56) References Cited

U.S. PATENT DOCUMENTS

| | | | |
|---|---|---|---|
| 5,448,357 A | * 9/1995 | Muraki | 356/488 |
| 5,486,923 A | 1/1996 | Mitchell et al. | 356/356 |
| 5,559,600 A | 9/1996 | Mitchell | 318/356 |
| 5,646,730 A | 7/1997 | Mitchell et al. | 356/356 |
| 5,856,872 A | 1/1999 | Horwitz | 356/356 |
| 5,977,539 A | * 11/1999 | Holzapfel et al. | 356/499 |

* cited by examiner

*Primary Examiner*—Samuel A. Turner
(74) *Attorney, Agent, or Firm*—Hale and Dorr LLP

(57) ABSTRACT

A position sensor having a wavefront compensator, a detector array and a grating in a diffractive configuration, and which incorporates a second wavefront compensator and a second detector array in parallel with the first wavefront compensator and detector array, to provide a second optical channel for measurement of an additional degree of freedom (roll), the effects of which can then be removed from or utilized in the main measurement channel; and in which the relative effects of grating roll and grating displacement are different in this second channel when compared to the first sensing channel; and in one embodiment of which this differentiation is created by having different ratios of the grating period to the detector fringe period in the two channels.

16 Claims, 4 Drawing Sheets

US 6,552,802 B1

APPARATUS AND METHOD FOR ROLL INVARIANT REFLECTIVE POSITION SENSING

PRIORITY CLAIM UNDER 35 USC §119

This application claims the benefit of U.S. Provisional Application No. 60/132,347 filed May 4, 1999 under 35 USC §119.

STATEMENT OF INVENTION

This invention is an improved version of the encoder(s) disclosed in U.S. Pat. Nos. 5,559,600; 5,486,923 and 5,646,730 assigned to MicroE, Inc. of Natick, Mass., the assignee of the subject application. It optimizes the reflective mode operation of the disclosed encoders by reducing the previous system's sensitivity to grating roll. The invention is directly applicable to other reflective, grating based position sensing encoders, including encoders that do not use the technology disclosed in the foregoing referenced patents.

SUMMARY OF THE INVENTION

This invention incorporates a second wavefront compensator and a second detector array in parallel with the original wavefront compensator and detector array in a reflective diffractive encoder. No additional grating is required. This second optical channel provides for the measurement of an additional degree of freedom (roll), the effects of which can then be removed from the main measurement channel.

The core principle used in this invention is the creation of a second grating-movement sensing channel in which the relative effects of grating roll and grating displacement are different in this second channel when compared to the first sensing channel. As is described in this disclosure, we create this differentiation by having different ratios of the grating period to the detector fringe period in the two channels.

NOVEL ASPECTS OF THE INVENTION

This invention is novel in its ability to independently measure two degrees of freedom (roll and translation) of a single moving grating in a reflective, diffractive optical encoder. In many applications the benefit is to remove the effects of roll from the translation measurement, but in other applications it may be desirable to use this sensor for its ability to measure roll with interferometric accuracy.

The above and other features and advantages of the present invention will be more readily understood upon consideration of the following detailed description of various embodiments of the present invention and the accompanying drawings.

DESCRIPTION OF THE INVENTION

Figure 1:
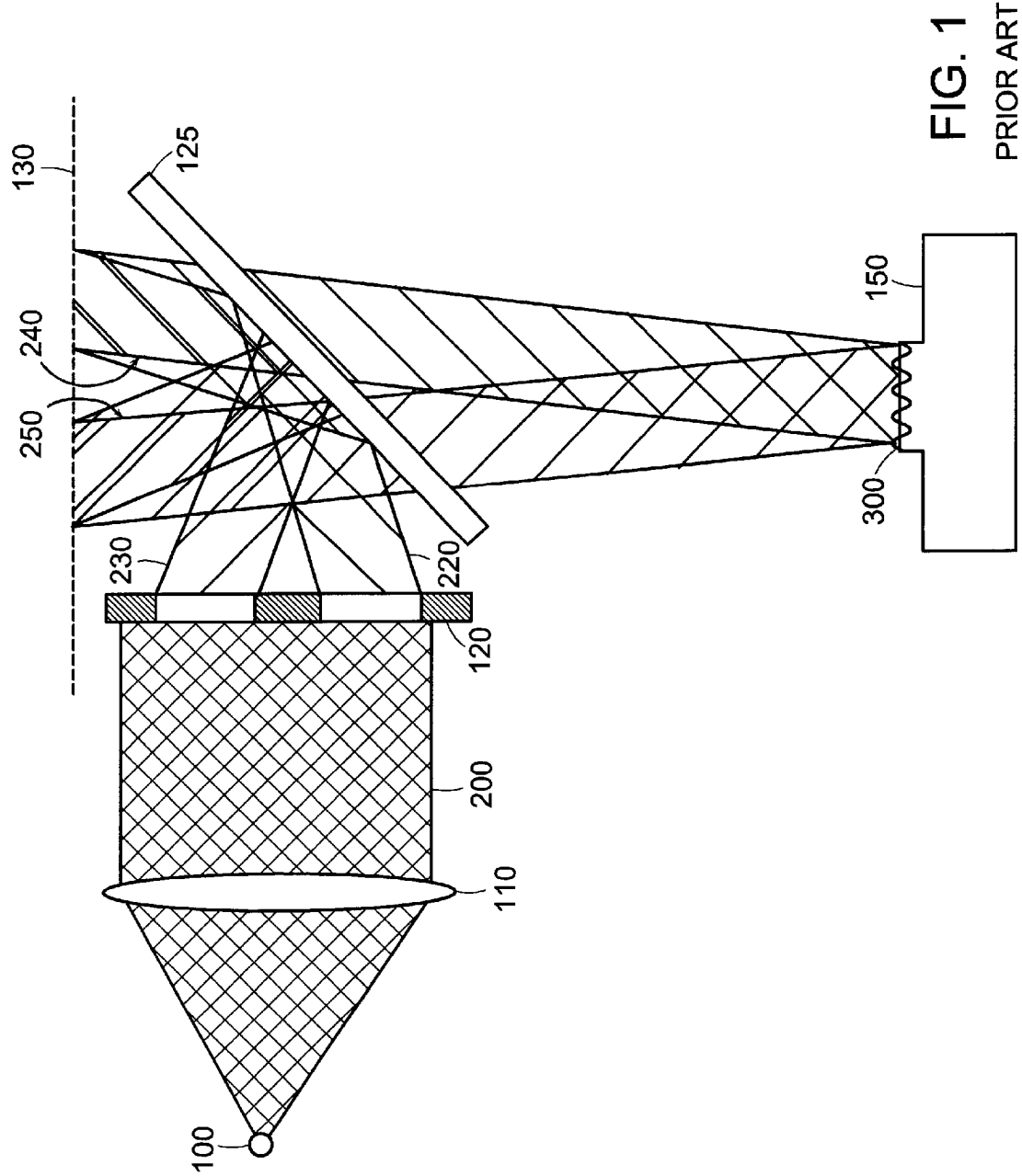
FIG. 1 illustrates a prior art sensor configuration.

The current invention, being an improvement upon the existing encoder disclosed in the above-referenced patents, is best understood by reference to the prior art, shown in FIG. 1. The above-referenced patents are incorporated herein by reference. A point source of quasi-monochromatic optical radiation (100) is located at the focal point of a lens (110) to create a collimated beam (200) of light. This beam of light passes through a wavefront compensator (120), which, in general, comprises diffractive or refractive elements and windowing elements. The wavefront compensator divides the collimated beam into two new beams of light (220, 230), which reflect from a beam splitter (125) as they propagate to the movable grating (130) whose position is to be sensed. The beams diffract from the grating in reflection to form two new beams (240, 250). The wavefront compensator has been designed to predistort and redirect beams 220 and 230 in such a fashion that, upon diffracting at grating 130, beams 240 and 250 are both plane waves propagating at a desired angle relative to each other. When these two beams reach the interdigitated detector array (150), after passing through beam splitter (125), they interfere and form a fringe pattern (300) whose spatial frequency is determined by the spatial frequency of the grating and the beams' angles of incidence on the grating, as determined by the wavefront compensator.

In this prior art sensor, the position displacement of the grating is calculated from the measured displacement of the fringes on the grating. As disclosed previously, there is a scale factor between the physical fringe displacement, $D_f$, and the grating displacement, $D_g$. That scale factor is linearly related to the ratio of the grating period to the fringe period. That is, each time the fringe moves by one of its cycles, $P_f$ (say, 30 microns), on the detector, the sensor estimates that the grating has moved by one of its cycles, $P_g$ (say, 5 microns)

[Note: for a phase-only grating, as described in the prior art, the grating actually moves by one-half cycle to produce a one cycle fringe movement]. This 6:1 ratio ($P_f$:$P_g$) is fixed. In general, $$D_f = \frac{P_f}{P_g} \times D_g$$

so we estimate the grating displacement from the fringe displacement with the estimate $$\hat{D}_g = \frac{P_g}{P_f} \times D_f$$

Figure 2:
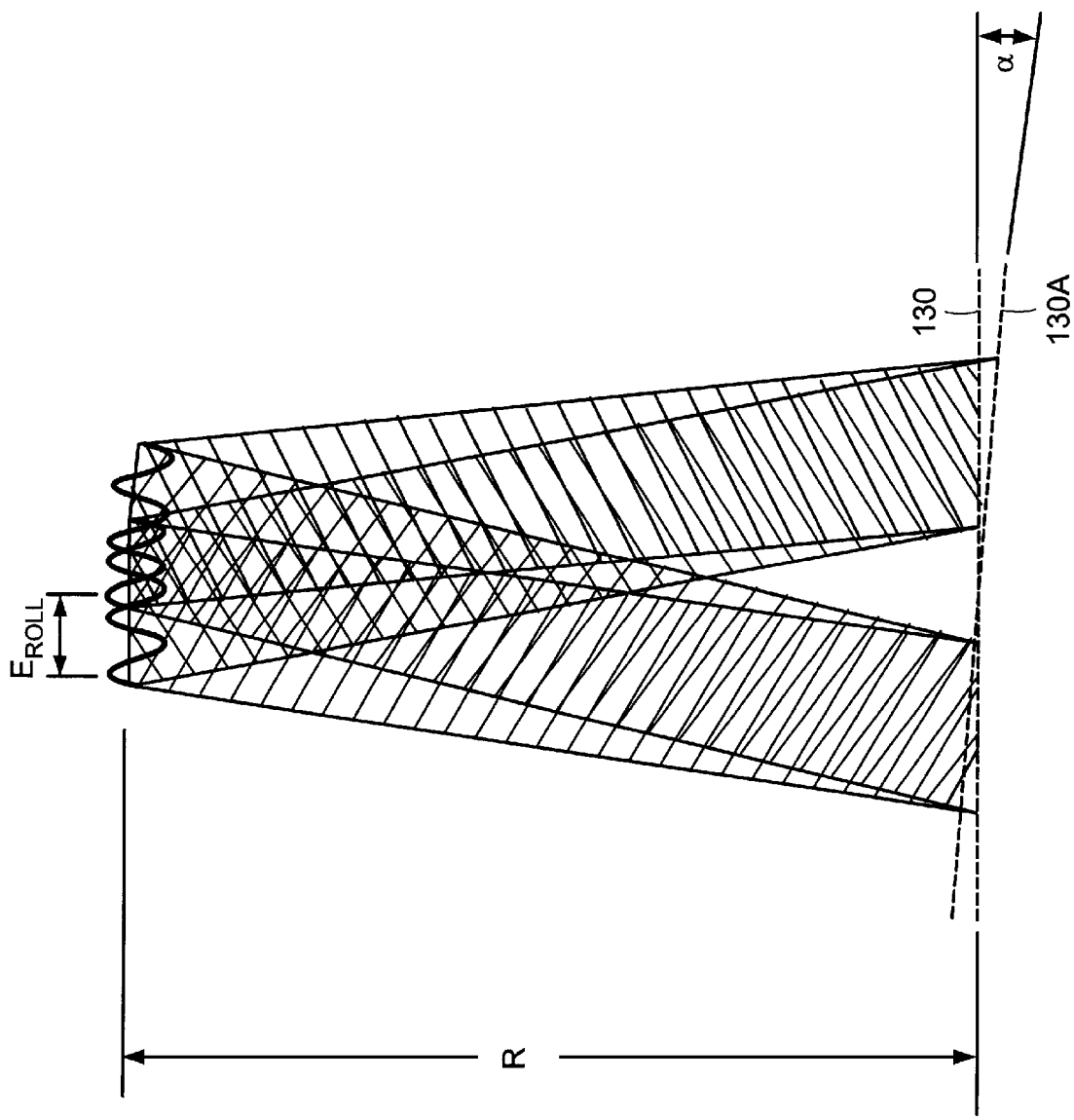
FIG. 2 illustrates the erroneous movement of the fringes which is caused by the rotation of the grating of FIG. 1 about the axis parallel to the grating's lines.

When this prior art sensor is used in reflection, roll (that is, rotation of the grating about the axis parallel to the grating's lines, as shown in FIG. 2) causes an erroneous movement of the fringes. That is, the fringes on the detector array are displaced even when there is no motion of the grating. The sensor has no means of differentiating fringe motion due to grating displacement from fringe motion due to roll, so an incorrect estimate of grating motion is reported. As shown in FIG. 2, the erroneous fringe motion generated by grating roll is simply the product of the roll angle, α, times the lever arm between the grating and the detector, r.

$$E_{roll} = \alpha r$$

This roll induced fringe displacement is interpreted by the sensor as a grating displacement, using the above defined scaling factor. That is, the measurement error due to roll, $$\hat{D}_{roll} = \frac{P_g}{P_f} \times E_{roll}$$

Figure 3:
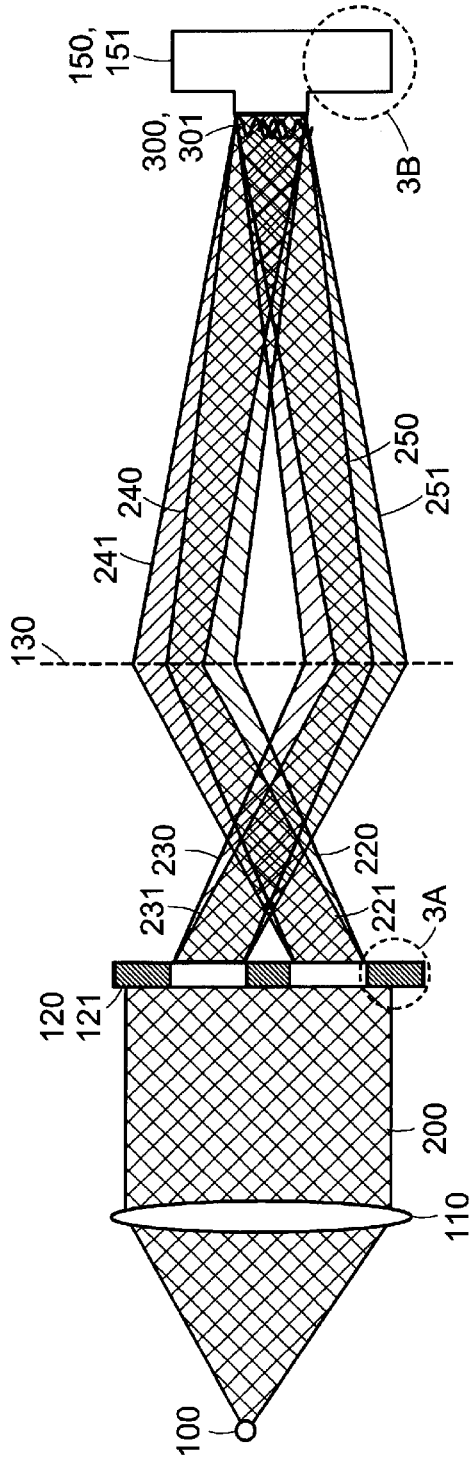
FIG. 3 illustrates a transmissive embodiment of the present invention.
Figure 3B:
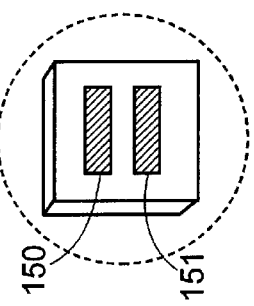
Figure 3A:
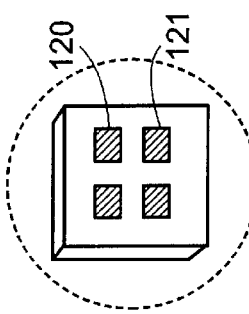

The disclosed invention eliminates the roll error from diffractive position sensors of this type. In this invention, as shown in FIG. 3 as a transmissive system for visual clarity only, the prior art sensor is modified by the addition of an auxiliary wavefront compensator (121) and a second interdigitated array (151). As in the prior art, quasi-monochromatic optical radiation from a point source (100) is converted into a collimated beam (200) by lens (110). This beam of light passes through the dual wavefront compensators (120, 121). The only differences between the main and auxiliary wavefront compensators are their positions and the angles at which they diffract the incoming beam. The wavefront compensators divide the collimated beam into two pairs of new beams of light (220, 230 and 221, 231), which propagate to the movable grating (130) whose position is to be sensed. The beams diffract from the grating to form four new beams (240, 250 and 241, 251). The main wavefront compensator is identical to the prior art while the auxiliary wavefront compensator has been designed to redirect beams 221 and 231 in such a fashion that, upon diffracting at grating 130, beams 241 and 251 are propagating at a different, pre-selected angle relative to each other than are beams 240 and 250. When these auxiliary beams reach the second interdigitated detector array (151) they interfere and form a fringe pattern (301) whose spatial frequency is intentionally different from the main fringe pattern. The detector spacing on detector array 151 is matched to the auxiliary fringe pattern's spatial frequency.

In operation, the behavior of the two fringe patterns is identical except for the scaling factor. Since the fringe movements due to grating movements are affected by the scaling factor(s), but the fringe movements due to roll are not, the two measurements can be combined to differentiate between roll and grating movement effects. Specifically, if the grating displacement estimated from the main detector is $$\hat{D}_{gM} = \frac{P_g}{P_{fM}} \times (D_{fM} + E_{roll}),$$

and the grating displacement estimated from the auxiliary detector is $$\hat{D}_{gA} = \frac{P_g}{P_{fA}} \times (D_{fA} + E_{roll}),$$

then the roll corrected grating displacement estimate is:

$$\hat{D} = \frac{(P_{fM}\hat{D}_{gM} - P_{fA}\hat{D}_{gA})}{P_{fM} - P_{fA}}$$

$$= \frac{P_{fM}\left[\frac{P_g}{P_{fM}} \times (D_{fM} + E_{roll})\right] - P_{fA}\left[\frac{P_g}{P_{fA}} \times (D_{fA} + E_{roll})\right]}{P_{fM} - P_{fA}}$$

$$= \frac{[(P_g D_{fM} + P_g E_{roll})] - [(P_g D_{fA} + P_g E_{roll})]}{P_{fM} - P_{fA}}$$

$$= \frac{P_g}{P_{fM} - P_{fA}}(D_{fM} - D_{fA})$$

$$= \frac{P_{fM} - P_{fA}}{P_{fM} - P_{fA}} D_g = D_g$$

Thus, the estimate of grating displacement is independent of roll and linearly related to the actual grating displacement.

It is evident to one skilled in the art that the two measurements can equally well be combined to eliminate the effect of grating motions and to estimate the roll of the grating only. The roll is estimated using the combination of data.

$$\hat{E}_{roll} = \frac{P_{fA}P_{fM}}{(P_{fA} - P_{fM})P_g}(\hat{D}_{gM} - \hat{D}_{gA})$$

$$= \frac{P_{fA}P_{fM}\left[\frac{P_g}{P_{fM}} \times (D_{fM} + E_{roll})\right] - \left[\frac{P_g}{P_{fA}} \times (D_{fA} + E_{roll})\right]}{(P_{fM} - P_{fA})P_g}$$

$$= \frac{P_{fA}P_{fM}\left[\left(\frac{P_g}{P_{fM}}D_{fM} + \frac{P_g}{P_{fM}}E_{roll}\right)\right] - \left[\left(\frac{P_g}{P_{fA}}D_{fA} + \frac{P_g}{P_{fA}}E_{roll}\right)\right]}{(P_{fM} - P_{fA})P_g}$$

$$= \frac{P_{fA}P_{fM}}{(P_{fM} - P_{fA})P_g}\left(\frac{P_g}{P_{fM}}E_{roll} - \frac{P_g}{P_{fA}}E_{roll}\right) = E_{roll}$$

Where the identity $$\frac{D_{fA}}{P_{fA}} \equiv \frac{D_{fM}}{P_{fM}} \equiv \frac{D_g}{P_g}$$

has been used.

Note that the roll estimate is scaled by the stand-off distance, or lever arm, r, between the grating and the detector plane. Errors in the knowledge of this distance is the ultimate limitation to the accuracy of the roll estimate.

PREFERRED EMBODIMENT

The preferred embodiment of this invention is to make a dual (parallel) optical path version of our "standard" reflective encoder, using two appropriate wavefront compensators and a dual detector array. In this regard the sensor embodiment is quite similar to the Vernier Index Position Sensor, described in U.S. Pat. No. 5,856,872, also assigned to the assignee of the subject application, except that the present invention includes the extra components needed to operate in reflection, and, unlike the Vernier Index Position Sensor embodiment, the present invention uses only a single track grating illuminated by two wavefront compensators. U.S. Pat. No. 5,856,872 is hereby incorporated in reference.

In our preferred embodiment we use two detector arrays designed for fringe periods of 50 and 75 microns respectively.

Signal processing is performed using two channels of any standard encoder signal processor to estimate the phase from each array. The simple added scaling and subtraction steps needed to estimate either translation or roll are easily performed by a digital processor.

Figure 4:
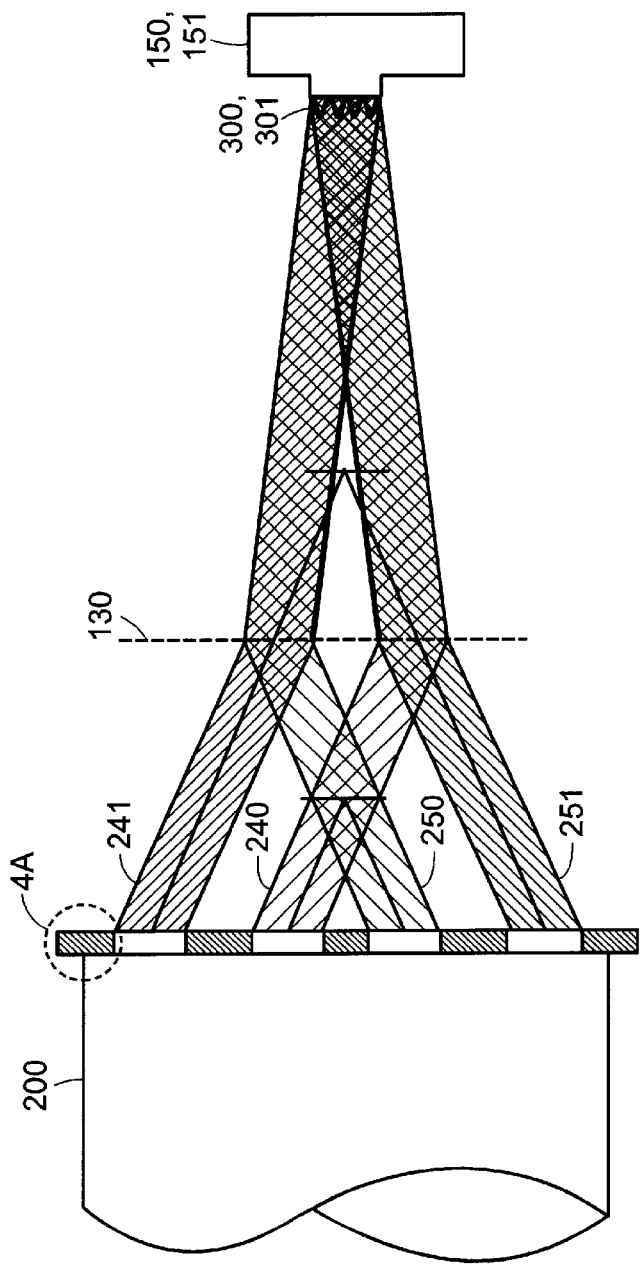
FIG. 4 illustrates a transmissive version of a second embodiment of the present invention.
Figure 4A:
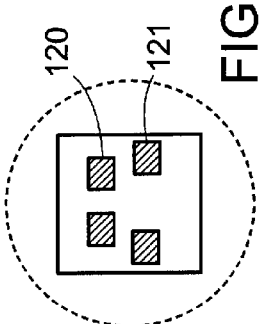

In a second embodiment we use two identical detector arrays designed for 75 micron fringes. In this second embodiment we introduce the concept of a negative fringe period. A negative fringe period is used to indicate that the movement of the fringes on the detector array, for a defined direction of grating motion, is reversed when compared to fringes having a positive period. As shown in transmission for clarity in FIG. 4, a negative fringe period is created when the beams (241 and 251) exiting the auxiliary wavefront compensator (121) are directed so that they would cross on the opposite side of the grating 130 than do the beams 240 and 250 that exit from the main wavefront compensator (120). These beams create fringes which move in the counter direction from the main fringes when the grating moves, because the roles of the positive and negative grating diffractive orders are reversed.

A third embodiment of this invention, obvious to one skilled in the art in light of the description provided herein, uses a single period wavefront compensator set, matched to a dual track grating that produces the appropriate fringe frequency on the two detector arrays.

As should be obvious to one skilled in the art in light of the description provided herein, any appropriate combination of wavefront compensator, grating, and detector array can be selected for the two channels, so long as the ratio of fringe period to grating period in each channel is different.

What is claimed is:

1. A method for sensing the position of a first member relative to a second member, movement of the first member relative to the first member being characterized by lateral displacement and roll, comprising the steps of:

providing one or more diffractive grating tracks on a diffractive grating scale attached to the first member;

directing a first pair of light beams to a first location on the one or more diffractive grating tracks, said first pair of beams reflectively diffracting from said diffractive grating scale to form a first set of optical fringes of a first periodicity $P_1$;

directing a second pair of light beams to a second location on the one or more diffractive grating tracks, said second pair of beams reflectively diffracting from said diffractive grating scale to form a second set of optical fringes of a second periodicity $P_2$, $P_2$ being different from $P_1$;

detecting a displacement of said first set of optical fringes $D_{fM}$ to generate a first signal representative of the displacement;

detecting a displacement of said second set of optical fringes $D_{fA}$ to generate a second signal representative of the displacement; and processing said first and second signals to combine them according to the equation $S_1D_1-S_2D_2$ wherein $D_1$ is a displacement of the diffractive grating scale estimated from $D_{fM}$ and $D_2$ is a displacement of the diffractive grating scale estimated from $D_{fA}$, and $S_1$ and $S_2$ are scale factors, to estimate the lateral displacement or roll of the diffractive grating scale or both.

2. The method of claim 1, wherein said one or more diffractive grating tracks include a first diffractive grating track having a first periodicity $P_g$;

said first pair of beams are beams of quasi-monochromatic light and wherein said step of directing a first pair of light beams includes the step of propagating the beams at a first predetermined angle with respect to each other;

said second pair of beams are beams of quasi-monochromatic light and wherein said step of directing a second pair of light beams includes the step of propagating the beams at a second predetermined angle with respect to each other, said first and second predetermined angles are different, and said first and second locations are on said first diffractive grating track;

said step of detecting a first displacement of said first set of optical fringes includes the step of using a first periodic, interdigitated detector array positioned to detect said first set of optical fringes, said first array having a periodicity N times $P_1$, N being greater than 2; and said step of detecting a second displacement of said second set of optical fringes includes the step of using a second periodic, interdigitated detector array positioned to detect said second set of optical fringes, said second array having a periodicity M times $P_2$, M being greater than 2.

3. The method of claim 2, wherein $P_2$ has the same magnitude and opposite sign as $P_1$.

4. The method of claim 3, wherein N and M are equal.

5. The method of claim 1, wherein S1 is $(P_1)/(P_1-P_2)$ and S2 is $(P_2)/(P_1-P_2)$, the step of processing estimating the lateral displacement of the diffractive grating scale.

6. The method of claim 1, wherein S1 and S2 are $(P_2 \times P_1)/(P_2-P_1)P_g$, wherein $P_g$ is the periodicity of said one or more diffractive grating tracks, the step of processing estimating the roll of the diffractive grating scale.

7. The method of claim 1, wherein said one or more diffractive grating tracks includes a first diffractive grating track having a first periodicity $P_{g1}$ and a second diffractive grating track having a second periodicity $P_{g2}$;

said first pair of beams are beams of quasi-monochromatic light and wherein said step of directing a first pair of light beams includes the step of propagating the beams at a first predetermined angle with respect to each other, and said first location is on said first diffractive grating track;

said second pair of beams are beams of quasi-monochromatic light and wherein said step of directing a second pair of light beams includes the step of propagating the beams at a second predetermined angle with respect to each other, said first and second predetermined angles are the same, and said second location is on said second diffractive grating track;

said step of detecting a displacement of said first set of optical fringes includes the step of using a first periodic, interdigitated detector array positioned to detect said first set of optical fringes, said first array having a periodicity N times $P_1$, N being greater than 2; and said step of detecting a displacement of said second set of optical fringes includes the step of using a second periodic, interdigitated detector array positioned to detect said second set of optical fringes, said second array having a periodicity M times $P_2$, M being greater than 2.

8. The method of claim 7, wherein S1 is $(P_{g2} \times P_1)/(P_1 \times P_{g2}-P_2 \times P_{g1})$ and S2 is $(P_{g1} \times P_2)/(P_1 \times P_{g2}-P_2 \times P_{g1})$, the step of processing estimating the lateral displacement of the first member.

9. The method of claim 7, wherein S1 and S2 are $(P_2 \times P_1)/(P_2 \times P_{g1}-P_1 \times P_{g2})$, the step of processing estimating the roll of the first member.

10. A position-sensing apparatus that measures the relative displacement of two members, the displacement being characterized by lateral displacement and roll, comprising:

a diffractive grating track on a diffractive grating scale attached to one member, said track having a periodicity $P_g$;

a first pair of beams of quasi-monochromatic light, said first pair of beams propagating at a first predetermined angle with respect to each other and said first pair of beams being incident on said grating at a first predetermined location along said grating, said first pair of beams reflectively diffracting from said grating to form a first set of optical fringes of a first periodicity $P_1$;

a second pair of beams of quasi-monochromatic light, said second pair of beams propagating at a second predetermined angle with respect to each other and said second pair of beams being incident on said scale at a second predetermined location along said grating, said second pair of beams reflectively diffracting from said grating to form a second set of optical fringes of a second periodicity $P_2$, $P_2$ being different from $P_1$;

a first periodic, interdigitated detector array, said array being positioned on said second member to detect said first set of optical fringes, said first array having a periodicity N times $P_1$, N being greater than 2, said first array generating a first signal representative of the position of the first set of optical fringes;

a second periodic, interdigitated detector array, said second array being positioned on said second member to detect said second set of optical fringes, said second array having a periodicity M times $P_2$, M being greater than 2, said second array generating a second signal representative of the position of the second set of optical fringes; and a signal processor that linearly combines the first and second signals to estimate the lateral displacement or the roll of the diffractive grating scale or both.

11. The apparatus of claim 10, wherein said processor operates to estimate the displacement of said first member relative to the second member using the formula $D_{EST}=(P_1 \times D_1 - P_2 \times D_2)/(P_1 - P_2)$, wherein $D_{EST}$ is the roll-corrected estimate of scale displacement, $D_1$ is the measured scale displacement from the first set of fringes, and $D_2$ is the measured scale displacement from the second set of fringes.

12. The apparatus of claim 10, wherein said processor operates to estimate the roll of said first member relative to the second member using the formula $R_{EST}=(P_1 \times P_2 \times D_1 - P_1 \times P_2 \times D_2)/(P_2 - P_1) \times P_g$, wherein $R_{EST}$ is the estimate of roll of the scale, $D_1$ is the measured scale displacement from the first set of fringes, and $D_2$ is the measured scale displacement from the second set of fringes.

13. The apparatus of claim 10, wherein $P_2$ has the same magnitude and opposite sign as $P_1$.

14. A position-sensing apparatus that measures the relative displacement of two members, the displacement being characterized by lateral displacement and roll, comprising:

a diffractive grating scale attached to one member, said scale having a first diffractive grating track with a first periodicity $P_{g1}$, and a second diffractive grating track with a second periodicity $P_{g2}$ being different from $P_{g1}$;

a first pair of beams of quasi-monochromatic light, said first pair of beams propagating at a first predetermined angle with respect to each other and said first pair of beams being incident on said first track at a first predetermined location, said first pair of beams reflectively diffracting from said first track to form a first set of optical fringes of a first periodicity $P_1$;

a second pair of beams of quasi-monochromatic light, said second pair of beams propagating at a second predetermined angle with respect to each other and said second pair of beams being incident on said second track at a second predetermined location, said second pair of beams reflectively diffracting from said second track to form a second set of optical fringes of a second periodicity $P_2$;

a first periodic, interdigitated detector array, said array being positioned on said second member to detect said first set of optical fringes, said first array having a periodicity N times $P_1$, N being greater than 2, said first array generating a first signal representative of the position of the first set of optical fringes;

a second periodic, interdigitated detector array, said second array being positioned on said second member to detect said second set of optical fringes, said second array having a periodicity M times $P_2$, M being greater than 2, said second array generating a second signal representative of the position of the second set of optical fringes; and a signal processor that uses the first and second signals to estimate the lateral displacement or the roll of the diffractive grating scale or both.

15. The apparatus of claim 14, wherein said processor operates to estimate the displacement of said first member relative to the second member using the formula $D_{EST}=(P_{g2} \times P_1 \times D_1 - P_{g1} \times P_2 \times D_2)/(P_1 \times P_{g2} - P_2 \times P_{g1})$, wherein $D_{EST}$ is the roll-corrected estimate of scale displacement, $D_1$ is the measured scale displacement from the first set of fringes, and $D_2$ is the measured scale displacement from the second set of fringes.

16. The apparatus of claim 14, wherein said processor operates to estimate the roll of said first member relative to the second member using the formula $D_{EST}=(P_1 \times P_2 \times D_1 - P_1 \times P_2 \times D_2)/(P_2 \times P_{g1} - P_1 \times P_{g2})$, wherein $R_{EST}$ is the estimate of roll of the scale, $D_1$ is the measured scale displacement from the first set of fringes, and $D_2$ is the measured scale displacement from the second set of fringes.

\* \* \* \* \*